June 24, 1969 — R. S. LAMART — 3,451,302
WIND INSTRUMENT TRAINING METHOD AND MEANS
Filed Feb. 5, 1968
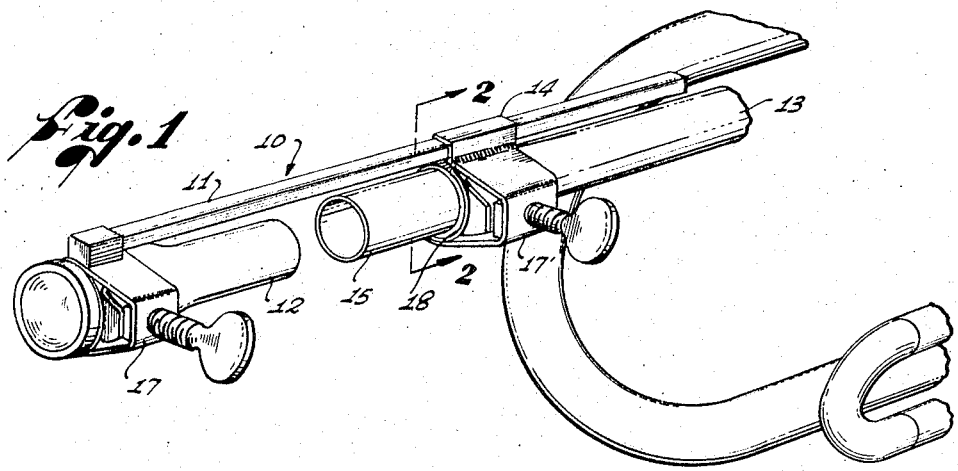
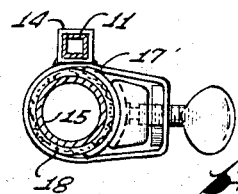
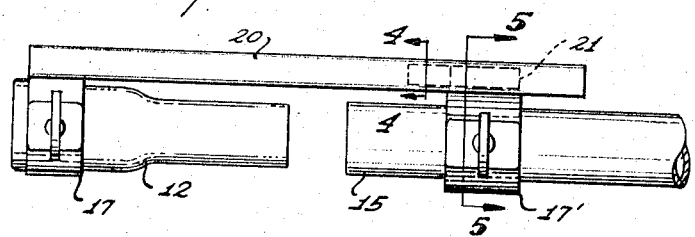
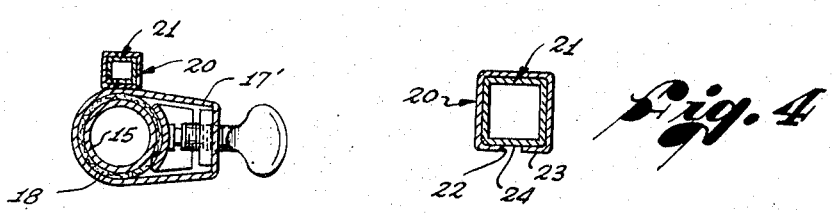
INVENTOR.
RENÉ S. LAMART
BY Fulwider, Patton, Rieber
Lee and Utecht
ATTORNEYS

United States Patent Office 3,451,302
Patented June 24, 1969

3,451,302
WIND INSTRUMENT TRAINING METHOD AND MEANS
René S. Lamart, 1335 N. Citrus Ave.,
Los Angeles, Calif. 90028
Filed Feb. 5, 1968, Ser. No. 703,047
Int. Cl. G10d 9/02
U.S. Cl. 84—465        8 Claims

ABSTRACT OF THE DISCLOSURE

A means or device adapted to be attached to wind instruments having a mouthpiece received by a mouth pipe, which, in the preferred embodiment, comprises a guide rod firmly attached to the mouthpiece or mouth pipe of the instrument and a sleeve firmly attached to the mouth pipe or mouthpiece, respectively, of the instrument. The guide rod is slidably received by the sleeve and the cross sections of the guide rod and sleeve are keyed to each other to prevent rotational movement of one relative to the other. The length of the guide rod and/or sleeve is sufficient to retain the guide rod and sleeve in telescoping relation when the mouthpiece is completely removed from the mouth pipe. This device serves to retain the mouth pipe and mouthpiece in axial alignment when the mouthpiece is withdrawn from the mouth pipe.

---

The preferred method comprises using a wind instrument having the above-described device attached thereto in cojunction with the following steps: (1) form the lips in a desired manner and commence blowing; (2) place the mouthpiece against the lips while continuing to blow; and (3) move the instrument toward the mouthpiece telescopes into the instrument mouth pipe.

BACKGROUND OF THE INVENTION

This invention relates to a training device and method for improving embouchure, tone and range in connection with the playing of wind instruments.

When learning to play or practicing on a musical instrument such as a clarinet or trumpet, a player must learn or practice proper shaping of the mouth or embouchure in order to obtain the desired musical sounds from the instrument. This has been and is presently accomplished by requiring the player to form his lips in a required manner and then either blowing into the instrument itself or initially blowing through the instrument mouthpiece alone and thereafter blowing through the instrument. The former method is unsatisfactory because it is especially difficult for the novice player to develop proper embouchure by immediately playing the instrument since he has not mastered other aspects of playing the instrument. The latter method is also unsatisfactory because of the discontinuity between blowing through the mouthpiece alone and blowing through the instrument. Although a player can develop proper embouchure by the foregoing methods, the learning process is relatively long and a player may quit attempting to learn to play the instrument because he may come to believe, because of the extensive practice required, that he is incapable of developing proper embouchure required for the playing of wind instruments.

A player must also learn how to properly force air outwardly through his mouth and must constantly practice the proper technique after learning it. Air must be forced up through the mouth using the diaphragm muscles. If these muscles are used, a player can play for longer periods of time because he can play more relaxed since less effort is required to expel air from the mouth using these muscles. Additionally, the player can play higher notes, the playing of which depends upon relatively high air velocities, because greater force can be applied to expel air from the lungs when using these muscles. By contrast, air expelled through the mouth using substantially only the throat muscles generally has insufficient velocity to produce the higher notes and, in addition, greater effort is required to expel air using the latter muscles.

Presently-used techniques for teaching use of the proper muscles are similar to those described for teaching proper embouchure for playing wind instruments. These techniques are also unsatisfactory for this purpose because they do not conform to natural breathing and because, where the mouthpiece alone is used, there is not continuity between blowing through the mouthpiece and later blowing through the instrument.

SUMMARY OF THE INVENTION

The device of this invention comprises a guide rod which is affixed to the mouthpiece or mouth pipe of a wind instrument and a sleeve which is affixed to the mouth pipe or mouthpiece, respectively, of the instrument and which is capable of slidably receiving the guide rod. The guide rod and sleeve are keyed to each other to prevent rotation of the guide rod relative to the sleeve and thereby prevent rotation of the mouthpiece out of alignment with the mouth pipe when the mouthpiece is removed from the mouth pipe. That is, the cross-sections of the guide rod and sleeve are anything but circular. The length of the guide rod and/or sleeve is such that they remain in telescoping relation even when the mouthpiece is completely removed from the mouth pipe. The sleeve or guide rod which is attached to the mouth pipe does not appreciably extend over the open end of the mouth pipe.

The preferred method of this invention comprises using the device of this invention when performing the following steps: (1) shaping the player's lips as required and blowing through the so-called lips; (2) while continuing to blow through the lips, bringing the mouthpiece to the lips; and (3) bringing the instrument towards the mouthpiece, while continuing to blow, until the instrument is telescoped over the mouthpiece at which time the initial blowing through the mouth is translated into equivalent musical sound. Alternatively, a player may shape his lips and bring the mouthpiece to his lips prior to commencing blowing and, thereafter, perform step (3) above.

Use of the foregoing method results in more rapid and improved development of proper embouchure and proper blowing. This is because the initial blowing is quite natural and, since this initial blowing is continued throughout the exercise, this natural blowing is easily transferred to blowing through the instrument. Additionally, because the exercise is continuous, that is, the initial lip formation is not altered throughout the exercise, the formation of the player's lips can be more readily related to the sound produced by the instrument.

The foregoing advantages are made possible by using the device of this invention because the player's attention is not distracted from the exercise by having to manually attempt to align the mouthpiece with the instrument. Instead, with the device of this invention, the mouthpiece and mouth pipe of an instrument remain in alignment and are readily moved into telescoping relation with each other. Thus, use of the device of this invention preserves and reinforces the continuity of the exercise of this invention with its attendant advantages as described.

DESCRIPTION OF THE DRAWINGS

FIGURE 1 is a partial perspective view of a wind instrument including a mouthpiece and a mouth pipe and shows the training device of this invention attached thereto.

FIGURE 2 is a sectional view taken along the line 2—2 of FIGURE 1.

FIGURE 3 is a partial perspective view of a wind instrument and shows a modification of the device of this invention shown in FIGURE 1.

FIGURE 4 is a sectional view taken along the line 4—4 of FIGURE 3.

FIGURE 5 is a sectional view taken along the line 5—5 of FIGURE 3.

DESCRIPTION OF THE PREFERRED EMBODIMENT

The training aid device of this invention comprises a guide rod fixedly attached to the mouthpiece of a wind instrument and a sleeve fixedly attached to the mouth pipe of the instrument and sized to slidably receive the guide rod. Alternatively, the sleeve may be attached to the mouthpiece and the guide rod may be attached to the mouth pipe. In either arrangement, the part (guide rod or sleeve) attached to the mouth pipe cannot appreciably extend over the open end of the mouth pipe. The guide rod and sleeve are keyed together so that they are not free to rotate relative to each other. Such keying thereby prevents the mouthpiece from moving out of alignment from the mouth pipe when the former is removed from the latter. Thus, this invention permits the air passage between a mouthpiece and a mouth pipe to be broken so that air passing through the mouthpiece does not pass through the mouth pipe and, yet, the air passage between the mouthpiece and mouth pipe can be quickly and easily remade to cause the instrument to produce a sound corresponding to the shape of the player's lips.

As used herein, the term "wind instrument" encompasses instruments which are classed as woodwind or reed such as the clarinet, oboe and saxophone, and instruments which are classed as brass instruments such as the trumpet, bugle and trombone. Each of these instruments is characterized by having a removable mouthpiece and is further characterized by requiring a player to particularly shape his lips in order to properly play the instruments.

The device of this invention will now be more specifically described with reference to the drawings in which the numeral 10 designates this device. This training device 10 preferably comprises a guide rod 11 which is attached to a mouthpiece 12 of a trumpet 13 and a sleeve 14 which is attached to a mouth pipe 15 of the trumpet. The guide rod 11 may be solid or hollow as shown in FIGURE 2 and is formed from any material which is relatively stiff and which substantially resists twisting about its longitudinal axis when provided with a cross-sectional area of about 0.016 square inch. A suitable material is copper.

The cross-sectional shape of the guide rod 11 is critical and must be non-circular. Preferably, the guide rod 11 has a cross-sectional shape which has sharply defined edges such as triangular cross-section or a square cross-section as shown in FIGURE 2. However, other configurations which limit rotational movement of the rod relative to the sleeve, for example, a rod having a generally circular cross-section but having an extension running the length of the rod, may also be used. The cross-sectional shape of the sleeve 14 is the same as that of the guide rod but its internal cross-sectional area is slightly larger than the external cross-sectional area of the guide rod so that the guide rod is slidably received by the sleeve. The combination of the described cross-sectional shape and size of the guide rod 11 and sleeve 14 substantially prevents rotation of the guide rod and sleeve relative to each other.

As used herein and in the claims, the term "non-circular" includes any rod and sleeve shape which prevents rotation of the rod relative to the sleeve.

The guide rod 11 is attached to the mouthpiece 12 so that one end is intermediate the ends of the mouthpiece and extends towards the mouth pipe 15 and is received by the sleeve 14 attached to the mouth pipe. The guide rod 11 extends through and beyond the sleeve 14 when the mouthpiece 12 is inserted in the mouth pipe 15 a length such that the guide rod remains received by the sleeve even when the mouthpiece is completely removed from the mouth pipe. For example, a guide rod six inches in length has been found adequate for use on a trumpet where a sleeve was mounted as shown in FIGURE 1 so that the nearest end of the sleeve to the guide rod was about two inches from the open end of the mouth pipe.

The sleeve 14 may be substantially shorter than the guide rod 11 (FIGURE 1) for example two inches (or it may be about the same length as the guide rod. However, the minimum length of the sleeve should be sufficient to substantially prevent transaxial movement of the guide rod and sleeve relative to each other.

The guide rod 11 and sleeve 14 may be attached to the mouthpiece 12 and mouth pipe 15, respectively, either fixedly or removably. Preferably, the attachment means prevents circumferential movement, in addition to preventing axial movement, of the guide rod 11 and sleeve 14 about the mouthpiece 12 and mouth pipe 15, respectively.

A suitable removable attachment means is shown in FIGURE 1 and includes a pair of clamps 17, 17' attached to the mouthpiece 12 and mouth pipe 15, respectively, and rigidly attached to the guide rod 11 and sleeve 14, respectively. Padding 18 such as felt, may be inserted between the instrument components and the clams 17, 17' to prevent marking or scoring of the instrument finish.

The method of this invention comprises first forming a note apart from a mouthpiece of a wind instrument by proper formation of a player's lips and by blowing through the so-formed lips. Next the mouthpiece when separated or disconnected from the instrument is brought into contact with the formed lips while the player continues to blow. Thereafter, the instrument is connected to the mouthpiece to translate the blowing into the desired musical note.

When using the device of this invention, a player first completely removes the mouthpiece 12 from the mouth pipe 15 without removing the guide rod 11 from the sleeve 14 as shown in FIGURE 1. The player next properly shapes his lips and commences to blow through his lips. He thereafter places his lips against the mouthpiece 12 while continuing to blow, after which he moves the instrument 13 toward the mouthpiece until the mouthpiece is fully received by the mouth pipe 15 at which time the musical sound associated with the formation of his lips will be heard. Because of the characteristics (cross-sectional shape and size) of the guide rod 11 and sleeve 14 which are mounted to the mouthpiece 12 and mouth pipe 15, respectively, the mouthpiece and mouth pipe are initially axially aligned and remain axially aligned without attention from the player. Thus, the mouthpiece 12 telescopes into the mouth pipe 15 while the player concentrates completely upon the musical exercise.

An alternative form of this invention, is shown in FIGURES 3 and 4. As shown therein, a sleeve 20 is attached to the mouthpiece 12 and a guide rod 21 is attached to the mouth pipe 15 in the same manner as shown in FIGURE 1. The cross-sectional shape and size limitations of the sleeve 20 and the guide rod 21 are the same as previously described. However, the sleeve 20 is sufficiently long so that it will still receive the guide rod 21 even when the mouthpiece 12 is completely removed from the mouth pipe 15 and the guide rod may be substantially shorter than the sleeve (the reverse of the FIGURE 1 device).

Because the guide rod 21 will generally have to be attached to the mouth pipe 15 at a point near the open end of the mouth pipe due to the physical construction of the wind instruments, the sleeve 20 is modified in this alternative arrangement so that it can freely pass the attachment point of the guide rod 21 to the clamp 17'. This may be done by providing the sleeve 20 with a slot 22 extending along one side 23 of the sleeve (FIGURE 4) so that the attachment point of the rod to the clamp 17' along a side 24 of the rod adjacent the slotted side 23 of the sleeve will not impede the telescoping of the sleeve over the guide rod (FIGURE 5).

Operation of the alternative form of this invention is identical to that previously described in connection with the device of FIGURE 1.

I claim:
1. A training device for wind instruments having a mouthpiece which telescopes into a mouth pipe, said device comprising:
   a first member adapted to be fixedly mounted on said mouth pipe in juxtaposed, axially-parallel relation thereto; and
   a second member adapted to be fixedly mounted on said mouthpiece in juxtaposed, axially-parallel relation thereto, one of said first and said second members being shaped to slidably receive the other of said first and second members, said members being respectively of sufficient length to remain in telescoping relation when said mouthpiece is completely removed from said mouth pipe,
   said first and said second members being keyed to eliminate rotational movement of said first member relative to said second member,
   whereby said mouthpiece can be moved away from and toward said mouth pipe in axial alignment therewith.

2. The training device of claim 1 wherein one of said first and said second member is tubular.

3. The training device of claim 1 wherein one of said first and said second members is non-circular.

4. The device of claim 1 wherein said first member is a sleeve and said second member is a guide rod.

5. The device of claim 1 wherein said first member is a guide rod and said second member is a sleeve.

6. The device of claim 1 wherein the shortest of said first and said second members has a length sufficient to substantially eliminate transaxial movement of said first and said second members relative to each other.

7. The device of claim 1 wherein said first and said second members are mounted on said mouth pipe and said mouthpiece, respectively, so that axial and rotational movement of said first and said second members relative to said mouth pipe and said mouthpiece, respectively, is substantially eliminated.

8. The device of claim 1 wherein said first and said second members are removably mounted on said mouth pipe and said mouthpiece, respectively.

References Cited

UNITED STATES PATENTS

| 377,493 | 2/1888 | Meister | 84—398 |
| 1,204,060 | 11/1916 | Phillips | 84—399 |

RICHARD B. WILKINSON, *Primary Examiner.*

LAWRENCE R. FRANKLIN, *Assistant Examiner.*

U.S. Cl. X.R.

84—399